INVENTOR.
MICHAEL J. KELLY
BERNARD J. REKIERE
BY Spencer E. Olson
ATTY.

June 24, 1969 M. J. KELLY ET AL 3,452,297

NONLINEAR PCM ENCODER HAVING FEW ANALOG-TO-QUANTIZED SIGNAL COMPARISONS WITH RESPECT TO THE PERIOD OF THE PCM SIGNAL GENERATED

Filed March 14, 1966

Sheet 3 of 6

June 24, 1969 M. J. KELLY ET AL 3,452,297

NONLINEAR PCM ENCODER HAVING FEW ANALOG-TO-QUANTIZED SIGNAL COMPARISONS WITH RESPECT TO THE PERIOD OF THE PCM SIGNAL GENERATED

Filed March 14, 1966 Sheet 6 of 6

United States Patent Office 3,452,297
Patented June 24, 1969

3,452,297

NONLINEAR PCM ENCODER HAVING FEW ANALOG-TO-QUANTIZED SIGNAL COMPARISONS WITH RESPECT TO THE PERIOD OF THE PCM SIGNAL GENERATED

Michael J. Kelly, Melrose Park, and Bernard J. Rekiere, Addison, Ill., assignors to Automatic Electric Laboratories, Inc., Northlake, Ill., a corporation of Delaware Filed Mar. 14, 1966, Ser. No. 534,097
Int. Cl. H03k 7/00, 13/02; G08c 11/00
U.S. Cl. 332—9 9 Claims

ABSTRACT OF THE DISCLOSURE

An input signal is encoded by a PCM encoder having a nonlinear quantizing characteristic which is defined by 64 quantizing levels including major quantizing levels of 0, 8, 16 . . . 64 with seven minor quantizing levels between each of the major levels. The major levels are generated first by a first series of logically controlled current generators and a plurality of corresponding impedances to obtain, through comparison techniques, the major level which is nearest but less than the input signal. Upon determining the correct major level, the correct minor level is similarly determined by a second series of logically controlled current generators which employs the impedance corresponding to the correct first generator so that the minor levels are added to the correct major level.

This invention relates generally to pulse code modulation systems and more particularly to a nonlinear encoder for converting a sampled analog signal into a corresponding binary pulse code signal.

Pulse code modulation (PCM) of an analog signal generally involves sampling the analog signal at particular intervals and converting the sampled signal into an appropriate pulse code signal having a certain number of digits. A quantizing error is inherent in the encoding process because the pulse code signal is only capable of representing a number of discrete amplitude levels while the analog signal has a continuous range of amplitudes. This quantizing error remains when the pulse code signal is reconverted to an analog signal at the receiver since the quantizing characteristic of the decoder is identical to that of the encoder.

It is readily apparent that, if quantizing is performed in accordance with a linear characteristic, the quantizing error is most serious for the signals of lower amplitude. This follows from the fact that the ratio of possible error amplitude to signal amplitude is greatest at small signal amplitude. The severity of this error is further increased when the probability of occurrence of smaller amplitude signals is greater than that of higher amplitude signals such as occurs in commercial telephony.

It would be possible to reduce the amount of quantizing error by increasing the number of digits in the pulse code signal. However, increasing the number of digits increases the transmission time per signal and decreases the capacity of the system, so this approach has its limitations.

It has been found to be more advantageous to use a nonlinear quantizing characteristic which provides for more quantizing levels at lower amplitudes and correspondingly fewer quantizing levels at higher amplitudes. Implementation of this technique takes two general forms. In one method the analog signal sample is preamplified in a nonlinear manner before being encoded according to a linear characteristic. In the other method the analog signal sample is directly encoded in accordance with a nonlinear characteristic. Because of the problems inherent in the nonlinear elements used in the former method, it has proven to be much simpler to use the latter method in which transistors and linear impedances are the essential elements.

Present systems for accomplishing direct nonlinear encoding generally require either an elaborate configuration of attenuators with apparatus for switching from one attenuator to another or a large number of voltage generators to generate the quantizing levels of the desired nonlinear characteristic. Moreover, these systems also require that a large number of comparisons be made between the generated quantizing levels and the sampled analog signal. This number of comparisons is often several times greater than the number of digits in the pulse code signal so that the time required for encoding is much greater than the length of the period of the pulse code signal. This results in a system with a correspondingly low capacity.

Therefore, it is an object of this invention to provide a pulse code modulation system wherein the time required for encoding each signal sample is decreased and the system capacity is correspondingly increased.

It is a further object of this invention to provide a generator capable of generating the quantizing levels of any expressible nonlinear quantizing characteristic with a minimum of components.

In accordance with this invention, the pulse code modulation system comprises a sampling capacitor on which the sampled analog signal is stored; a generator for generating voltages corresponding to the quantizing levels of the nonlinear quantizing characteristic; a comparison circuit for comparing the amplitudes of the sampled signal and the generated voltage; an output circuit for producing a digit of the pulse code signal in accordance with the output of the comparison circuit; and a logic network controlling the generator.

The generator comprises a plurality of impedances connected to a common output terminal; a plurality of major and minor current generators having their outputs connected to the output terminal; and a plurality of switching transistors connected to the current generators and impedances to turn on the current generators and to complete a circuit to ground reference potential through the impedances. The switching transistors are operated under the control of the logic network of the system. Each of the major current generators is associated with one of the impedances and has an output current which produces a major voltage at the common terminal when that generator and its associated impedance alone are operating in the circuit. Each of these major voltages corresponds to a major quantizing level of the quantizing characteristic. Thus the major current generators and their associated impedances generate the major quantizing levels which divide the overall quantizing characteristic into major regions.

Within each of these major regions of the quantizing characteristic are a number of minor quantizing levels. The number of minor quantizing levels in each region is the same; but because the characteristic is a nonlinear one, the separation between minor levels varies within each major region and from one major region to another. Separate sets of minor current generators could be used with each impedance to generate the minor quantizing levels within each major region, but this would require a large number of minor current generators. Therefore, according to this invention, the values of the impedances are chosen in accordance with a relationship derived from the expression for the quantizing characteristic so that the number of minor current generators required is equal to the number of minor quantizing levels within a single major region of the quantizing characteristic. Thus a single set of minor current generators is used with individual impedances and associated major current generators to generate all of the minor quantizing levels.

The result of the provision of this generator in PCM system is that, under the control of the logic network, an appropriate sequence of major and minor quantizing levels can be generated for one-at-a-time comparison with the amplitude of the sampled analog signal so that a digit of the required pulse code signal can be produced by the output circuit at the time each comparison is made.

Since the time required to encode a signal sample is a major limitation on the capacity of a PCM system, it is readily apparent that the decrease in the number of required comparisons which is achieved in the system according to this invention substantially increases the capacity of the system. Moreover, this result is achieved by using a generator which is a simple configuration of current generators and impedances.

Further objects and features and a complete understanding of this invention will be gained from a consideration of the following description in conjunction with the accompanying drawings in which:

FIG. 1 is a block schematic diagram of a PCM encoder inaccordance with this invention;

FIGS. 2, 3, and 4 comprise an electrical schematic diagram of a particular embodiment of the PCM encoder in accordance with this invention;

Figure 1:
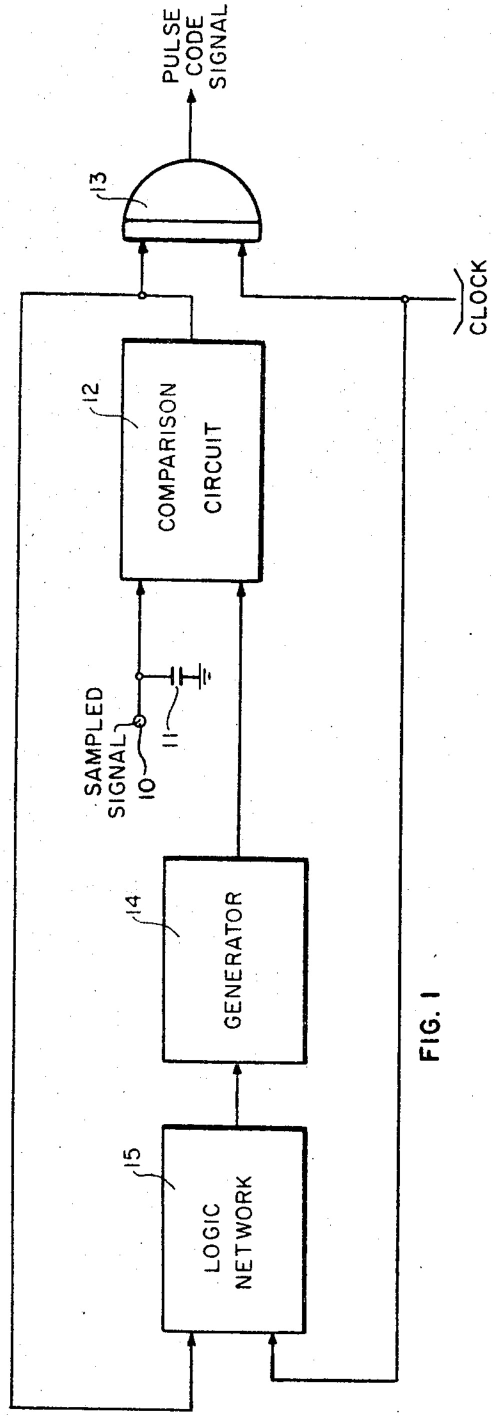
Figure 5:
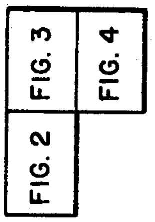
FIG. 5 shows the manner of arrangement of FIGS. 2, 3, and 4.

FIG. 1 shows a PCM encoding system in block diagram form. The sampled analog signal is applied to input terminal 10, and the storage capacitor 11 is charged to the amplitude of this input signal. The sampled analog signal is obtained from the analog signal in a manner which is known in the art. The sampled signal is stored on the capacitor 11 until the encoding process is completed, at which time the capacitor 11 is discharged to ground, and the process is repeated by charging the capacitor to the next sampled signal amplitude. The voltage stored on the capacitor 11 is applied directly to the comparison circuit 12. The output of the generator 14 is also applied directly to the comparison circuit 12. The comparison circuit 12 compares the amplitudes of the two input signals and provides an output signal when the amplitude of the signal from the generator is less than the amplitude of the voltage storage capacitor 11.

The generator 14 is under the control of the logic network 15. In accordance with control signals from the logic network 15, the generator 14 generates a quantizing level which is applied to the comparison circuit 12. The comparison circuit 12 compares the amplitude of the quantizing level with the amplitude of the sampled signal and provides an output signal when the amplitude of the quantizing level is less than that of the sampled signal. The output of the comparison circuit provides an input to the coincidence gate 13. The coincidence gate 13 also has a clock input, so that when the arrival of a clock pulse coincides with an output signal from the comparison circuit 12, an output pulse is provided. When a clock pulse arrives at coincidence gate 13 without an output signal from the comparison circuit 12, no output pulse is provided by the coincidence gate 13.

The output of comparison circuit 12 is also fed back into the logic network 15; and as will become apparent later, the logic network responds to the feedback of this output by causing the generator 14 to generate individual quantizing levels in a particularly appropriate sequence for comparison with the sampled analog signal. As a result, the output digits of coincidence gate 13 are the digits of the required pulse code signal. Thus, each time a clock pulse arrives at the logic network 15 and the coincidence gate 13, a digit of the pulse code signal is produced on the output of the coincidence gate 13 in accordance with the input from the comparison circuit 12, and at the same time the logic network 15 causes the generator 14 to generate the next appropriate quantizing level in accordance with the input from the comparison circuit 12. The operation of this encoding system will become more apparent in the detailed description of the structure and operation of a particular embodiment which follows.

Figure 2:
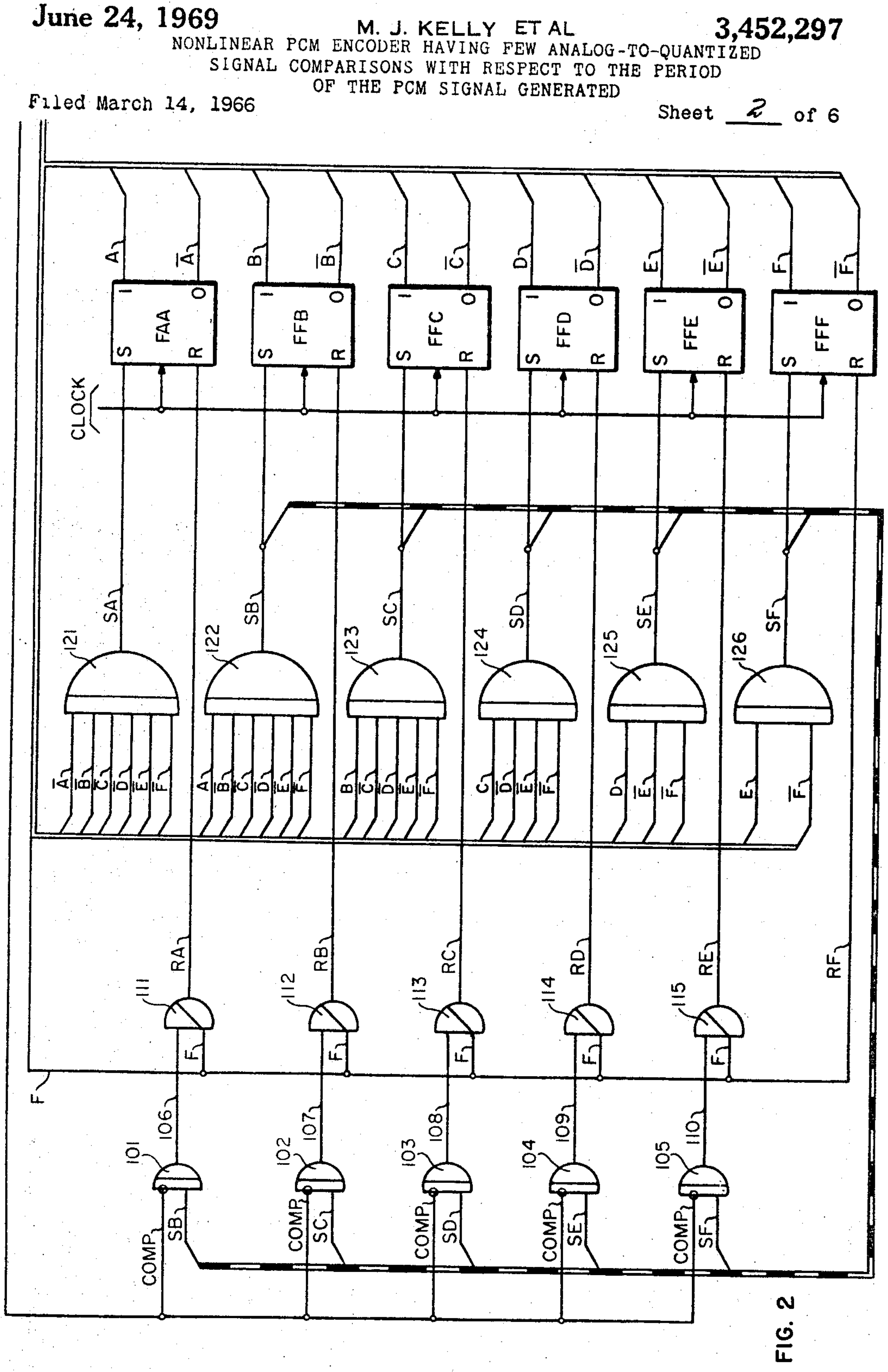
Figure 3:
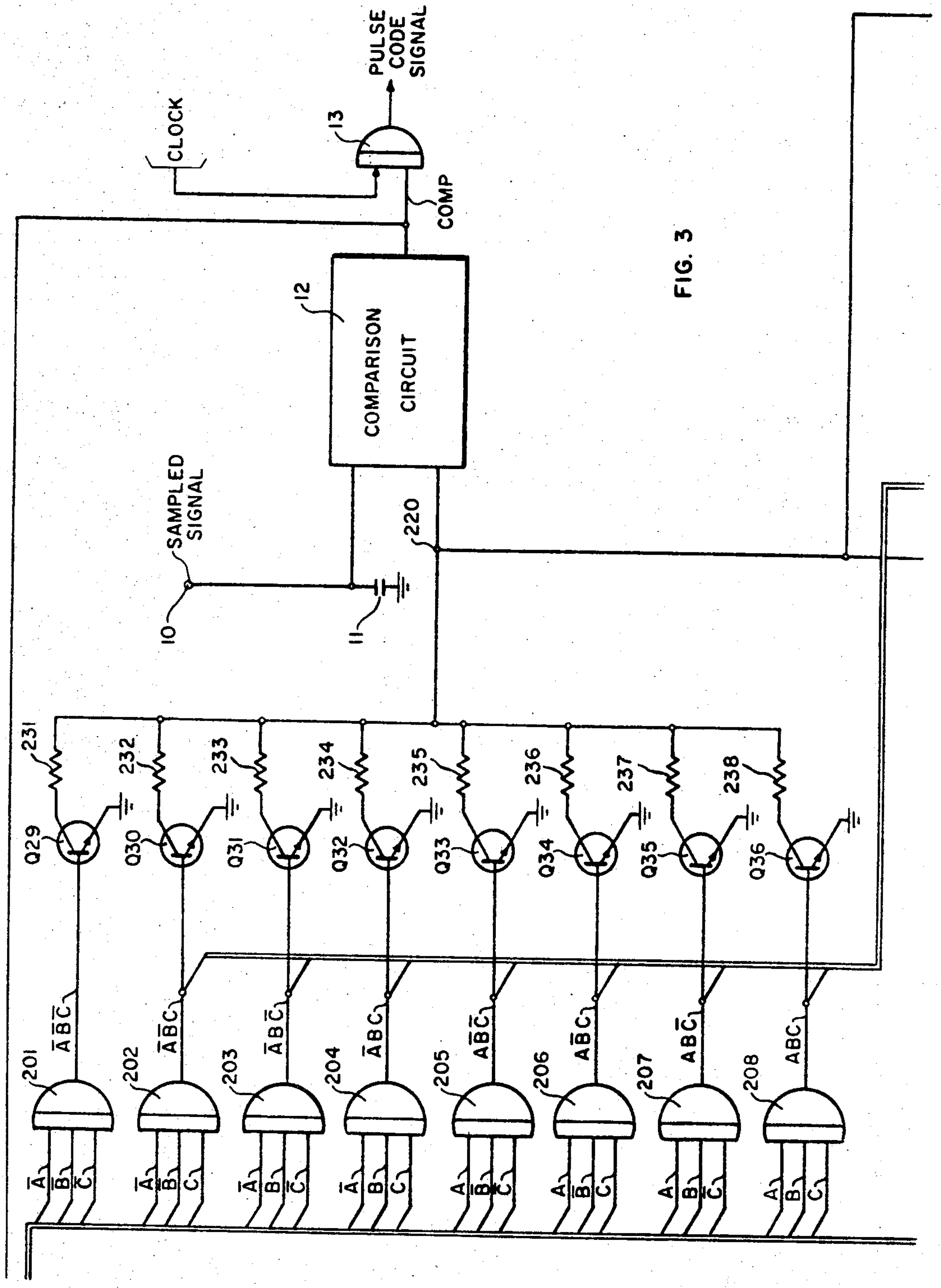
Figure 4:
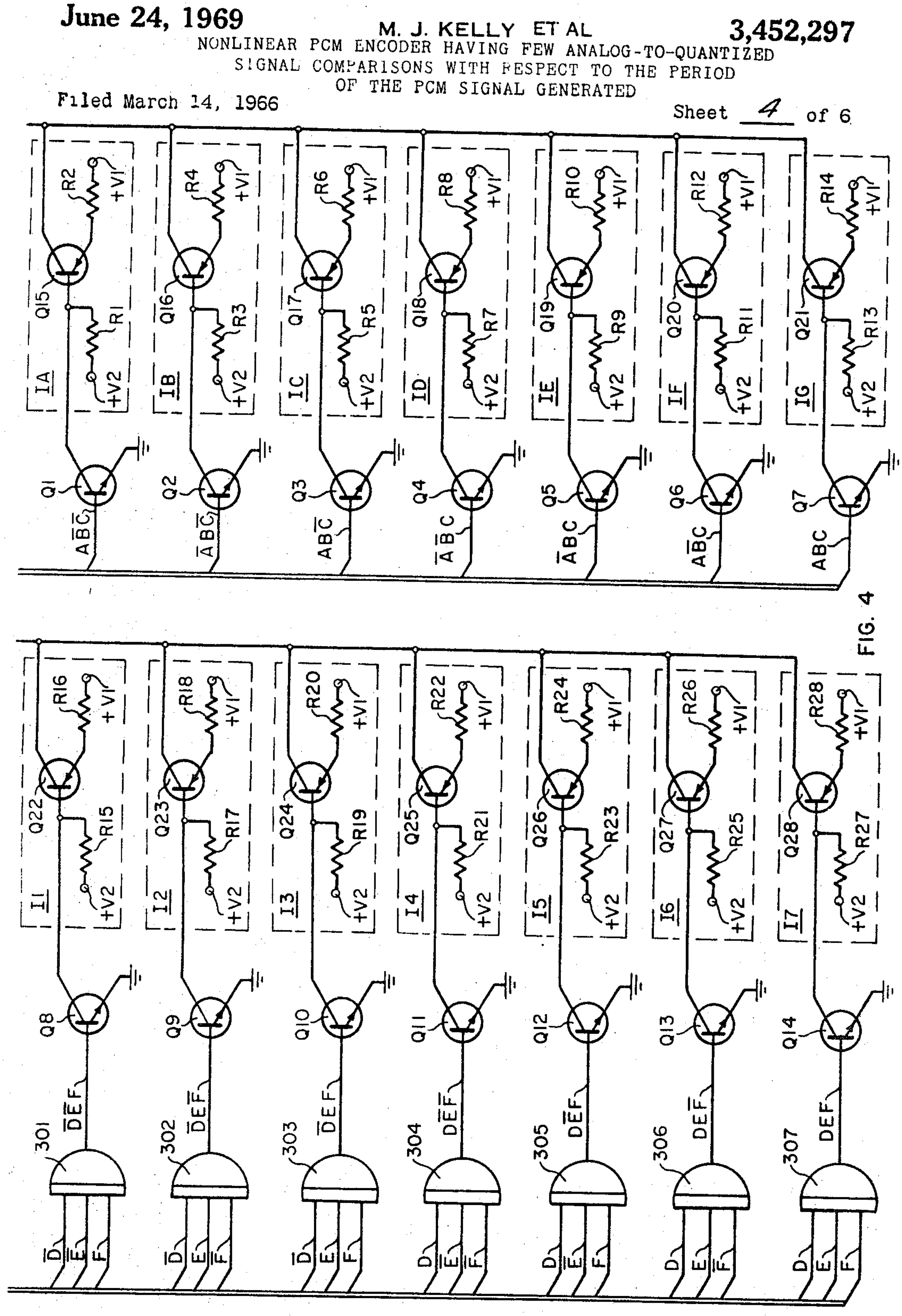

In FIGS. 2, 3, and 4 a particular embodiment of the nonlinear PCM encoder is shown. The particular embodiment chosen for this description is a six digit encoder; but, the techniques involved can be used in an encoder employing any number of digits. Six digits are generally required to represent adequately the amplitude of an audio signal, and they provide for a total of $2^6$, or 64, quantizing levels, numbered from 0 through 63.

In practice, if the sampled analog signal will have both positive and negative polarities, a seventh digit representing the polarity is required, and apparatus to provide this seventh digit must be provided. Since apparatus of this type is available and does not form a part of this invention, this description will be limited to the encoding of the amplitude of the sampled signal.

Figure 6:
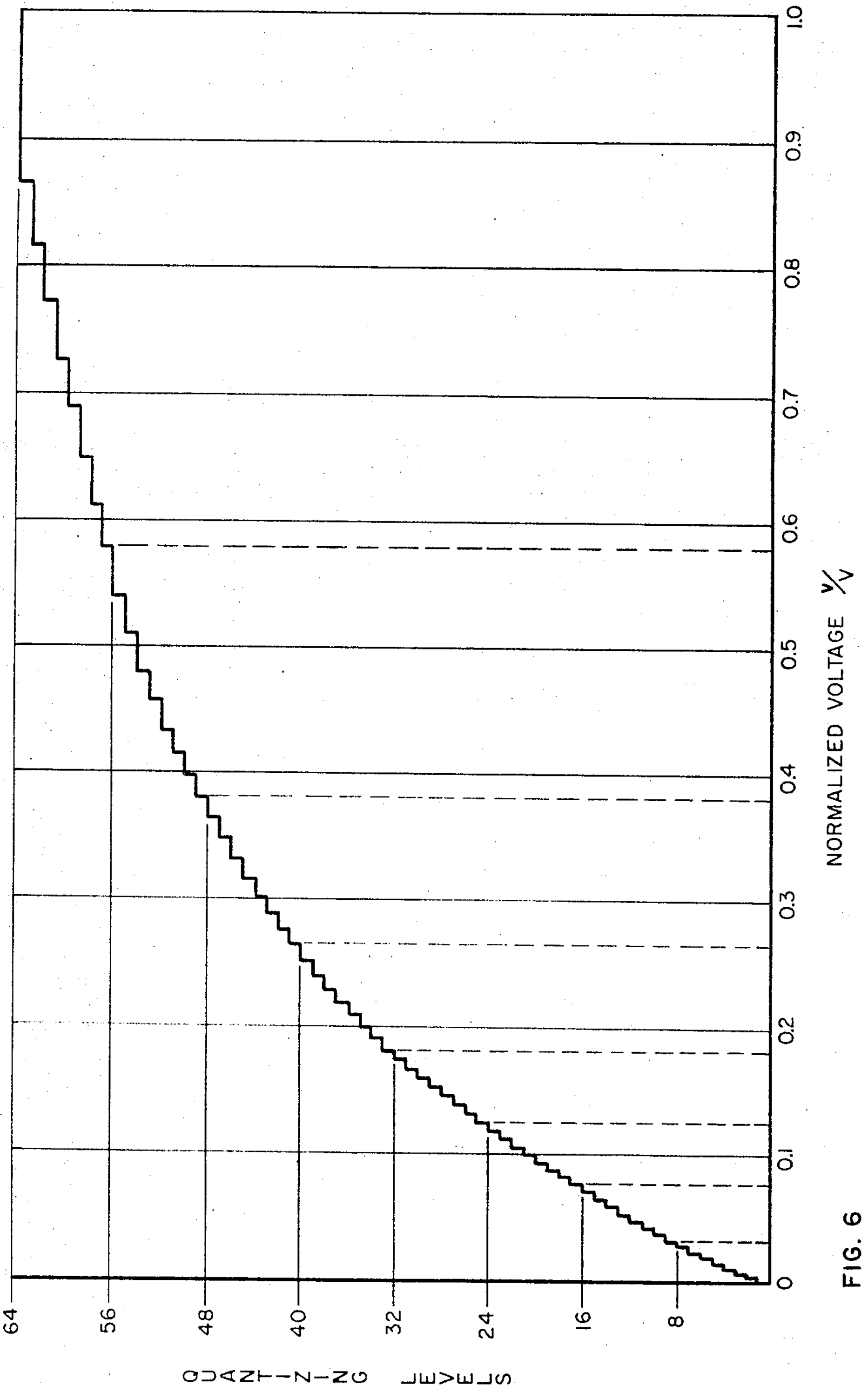
FIG. 6 is a graph of a possible nonlinear quantizing characteristic.

For purposes of illustration, the 64 quantizing levels are divided into 8 major quantizing levels and 7 minor quantizing levels between each of the major quantizing levels. The 8 major quantizing levels divide the quantizing characteristic into 8 major regions. A sample of a possible nonlinear quantizing characteristic is shown in FIG. 6. The general equation of this type of curve is as follows:

$$\frac{n}{64}=\frac{1}{\mu}[(1+\mu)^{v/V}-1) \qquad (1)$$

where $n$ is the quantizing level, $\mu$ is a compression factor, and $v/V$ is the normalized voltage level. In FIG. 6, the 8 major quantizing levels are shown on the $y$ axis and the normalized voltage $v/V$ is shown on the $x$ axis. As can be seen from this graph, the 8 major quantizing levels divide the quantizing characteristic into 8 major regions which are unequal.

With reference to FIGS. 2, 3 and 4, it can be seen that eight separate impedances 231 to 238, seven major current generators IA to IG, and seven minor current generators I1 to I7 are required for this particular 6 digit encoder. One terminal of each of the impedances, and the outputs of each of the current generators are connected to a common terminal 220. The switching transistors Q1 to Q7 operate to turn on the major current generators IA to IG, and the switching transistors Q8 to Q14 operate to turn on the current generators I1 to I7. The switching transistors Q29 to Q36 operate to provide a path for the current through the impedances 231 to 238 to ground reference potential. Each of these switching transistors is operated under the control of an output from one of the decoding coincidence gates 201 to 208 and 301 to 307. Since the switching transistors and current generators are of a well known type, they will not be described in detail here.

Each of the major current generators IA to IG is associated with a particular one of the impedances 231 to 238. The impedance 231 has no major current generator associated with it since it is used for the generation of quantizing level 0. This association is evident from the common inputs to the switching transistors associated with the major current generators and impedances. For example, the output of coincidence gate 205 labeled $A\overline{BC}$ provides the input to the switching transistor Q33 connected to impedance 235 and also the input to switching transistor Q1 associated with major current generator IA. Thus, major current generator IA will be turned on at the same time that the impedance 235 is grounded so that the output current of the generator IA will be conducted through the impedance 235 to ground.

The output currents of the major current generators IA to IG and the impedance values of the impedances 231 to 238 are chosen so that when the current from one to of the major current generators is conducted through its associated impedance to ground, a major voltage will be generated at terminal 220 corresponding to one of the major quantizing levels of the quantizing characteristic. Thus, for example, when major current generator IA is turned on and impedance 235 is grounded, the output current of major current generator IA through impedance 235 generates a voltage at terminal 220 corresponding to the major quantizing level numbered 32. The impedances 231 to 238 are numbered so that 231 is associated with the first major logic level, 0; 232 is associated with the second major logic level, 8; 233 is associated with the third major logic level, 16; and so on. From this, it is apparent that, by turning on the appropriate major current generator and grounding its associated impedance, any one of the major logic levels can be generated at the terminal 220. Of course, no major current generator is associated with the impedance 231 since the lowest major quantizing level is 0, and no current is required to generate a zero voltage across 231.

As was pointed out earlier, in order for the set of minor current generators I1 to I7 to generate all of the minor quantizing levels, the mipedances 231 to 238 must be given impedance values in accordance with a relationship derived from the expression for the quantizing characteristic. If the Equation 1 given above is the expression for the quantizing characteristic, the relationship required between the impedance values of the impedances 231 to 238 is the following:

$$\sigma_k=\sigma_{k-1}(1+\mu)^{1/8} \qquad (2)$$

where $\mu$ is the compression factor, $k=1, 2, \ldots 8$; and $\sigma_k$ is the conductance value of the $k$th impedance.

It can be shown that, by setting the values of the impedances in accordance with Equation 2, only one set of seven minor current generators is required to generate the seven minor quantizing levels within each of the major regions of the quantizing characteristic. Thus, the output currents of the minor current generators I1 to I7 can be set in accordance with the values of the impedances 231 to 238 and the output currents of the major current generators IA to IG so that the minor quantizing levels in each of the major regions of the quantizing characteristic can be generated. In practice, the generation of these minor quantizing levels is accomplished by first generating a major quantizing level and then adding the output current from the individual minor current generators to the output current from the particular major current generator involved to generate at terminal 220 the minor quantizing levels. For example, in FIGS. 3 and 4 the output current of major current generator IA through the impedance 235 generates the major quantizing level 32, as previously described; and inasmuch as generators I1 to I7 generate the currents which produce increasing minor voltages (levels) 1 to 7, respectively, the addition of the output current from minor current generator I1 to that of major current generator IA generates the minor quantizing level 33, that is, the first (minor) level following major level 32, FIG. 6, at the output terminal 220.

From the above, it can be seen that each of the impedances 231 to 238 is not only used with its associated major current generator to generate a major quantizing level of the quantizing characteristic, but each of these impedances is also used when it is desired to generate any of the minor quantizing levels in the major region of the quantizing characteristic immediately above that particular major quantizing level. In this particular embodiment no more than one major current generator and one minor current generator are on at a particular time; but by properly combining the output currents of a single major current generator and a single minor current generator through the appropriate impedance, it is possible to generate at the output terminal 220 any of the minor quantizing levels of the quantizing characteristic.

As has been mentioned above, each of the current generators and impedances is put into operation in the circuit under the control of the outputs from the coincidence gates 201 to 208 and 301 to 307. These coincidence gates are a part of the logic network 15, shown in FIG. 1, which controls generator 14. The major component of the logic network is a storage register composed of six flip-flops FFA to FFF. Each of these flip-flops has two complementary outputs which serve as selected inputs to the coincidence gates 201 to 208 and 301 to 307. Each of these flip-flops is set or reset by the clock pulse input in accordance with the signal on its S and R inputs. For example, flip-flop FFA is set each time the clock pulse coincidences with a 1 on its S input and is reset each time a clock pulse coincides with a 1 on its R input. The outputs of the storage register are used selectively as inputs to the coincidence gates 201 to 208 and 301 to 307. These same outputs are fed back as selective inputs to the coincidence gates 121 to 126. The outputs SA to SF of the coincidence gates 121 to 126 provide the S inputs to the flip-flops FFA to FFF. Thus, the signal on the S input of each flip-flop at the time of arrival of a particular clock pulse is determined by the states of the appropriate flip-flops in the interval immediately preceding the arrival of the clock pulse.

The outputs SB to SF of the gates 122 to 126 also provide individual inputs to the coincidence gates 101 to 105. The output COMP of the comparison circuit 12 is also fed as an inhibit input to each of the coincidence gates 101 to 105. The outputs 106 to 110 of the coincidence gates 101 to 105 serve as inputs to the OR gates 111 to 115. The 1 output of the flip-flop FFF also provides individual inputs to the OR gates 111 to 115. The outputs RA to RE of the OR gates 111 to 115 provide the R inputs to flip-flops FFA to FFE. Following the cable anticlockwise, as viewed in FIG. 2, the 1 output of flip-flop FFF also provides the R input of flip-flop FFF via the connection which is separately referenced RF.

The operation of this logic network will now be described. The flip-flops FFA to FFF are set by a clock pulse in accordance with TRUE signals on the leads SA to SF, respectively. Because of the feedback of the outputs of the flip-flops FFA to FFF into the coincidence gates 121 to 126, as shown, the arrival of a clock pulse at a particular one of the flip-flops will cause the flip-flop to be set to its 1 state if the flip-flop is presently in its 0 state, the immediately preceding flip-flop is in its 1 state, and all of the succeeding flip-flops are in their 0 states. For example, if, immediately preceding the arrival of a clock pulse, flip-flop FFB is in its 0 state, flip-flop FFA is in its 1 state, and the flip-flops FFC to FFF are all in their 0 state. All of the inputs to coincidence gate 122 are TRUE, the output SB is correspondingly TRUE; and the clock pulse will set flip-flop FFB to 1.

The flip-flops FFA to FFF will be reset by a clock pulse if a TRUE input signal appears on leads RA to RF, respectively. Since the 1 output of the flip-flop FFF provides an input to each of the OR gates 111 to 115 and also the R input of flip-flop FFF, the leads RA to RF will each have a TRUE signal when flip-flop FFF is in its 1 state, and the clock pulse will reset each of the flip-flops FFA to FFF. A TRUE signal will also appear on the leads RA to RE when the outputs 106 to 110 of the coincidence gates 101 to 105, respectively, are TRUE. With the output COMP of the comparison circuit 12 as an inhibit input to each of the coincidence gates 101 to 105, the outputs 106 to 110 of these gates will be FALSE whenever the output COMP of the comparison circuit 12 is 1, or TRUE. However, if the output COMP of the comparison circuit 12 is 0, or FALSE, the outputs 106 to 110 of the coincidence gates 101 to 105 will be TRUE if the inputs SB to SF, respectively, are TRUE. This means, for example, that the output RA of OR gate 111 will be TRUE if the F output of flip-flop FFF is TRUE or if the output 106 of coincidence gate 101 is TRUE. The output 106 will be TRUE if the output COMP of the comparison circuit 12 is FALSE and the output SB of coincidence gate 122 is TRUE. The result is that flip-flop FFA will be reset by a clock pulse if flip-flop FFF is in its 1 state prior to the arrival of the clock pulse; and it will also be reset by a clock pulse if flip-flop FFB is to be set by the clock pulse, and the output COMP of the comparison circuit is FALSE. The reasons for setting and resetting the flip-flops in this manner will become apparent from a description of a typical encoding operation which follows.

Figure 7:
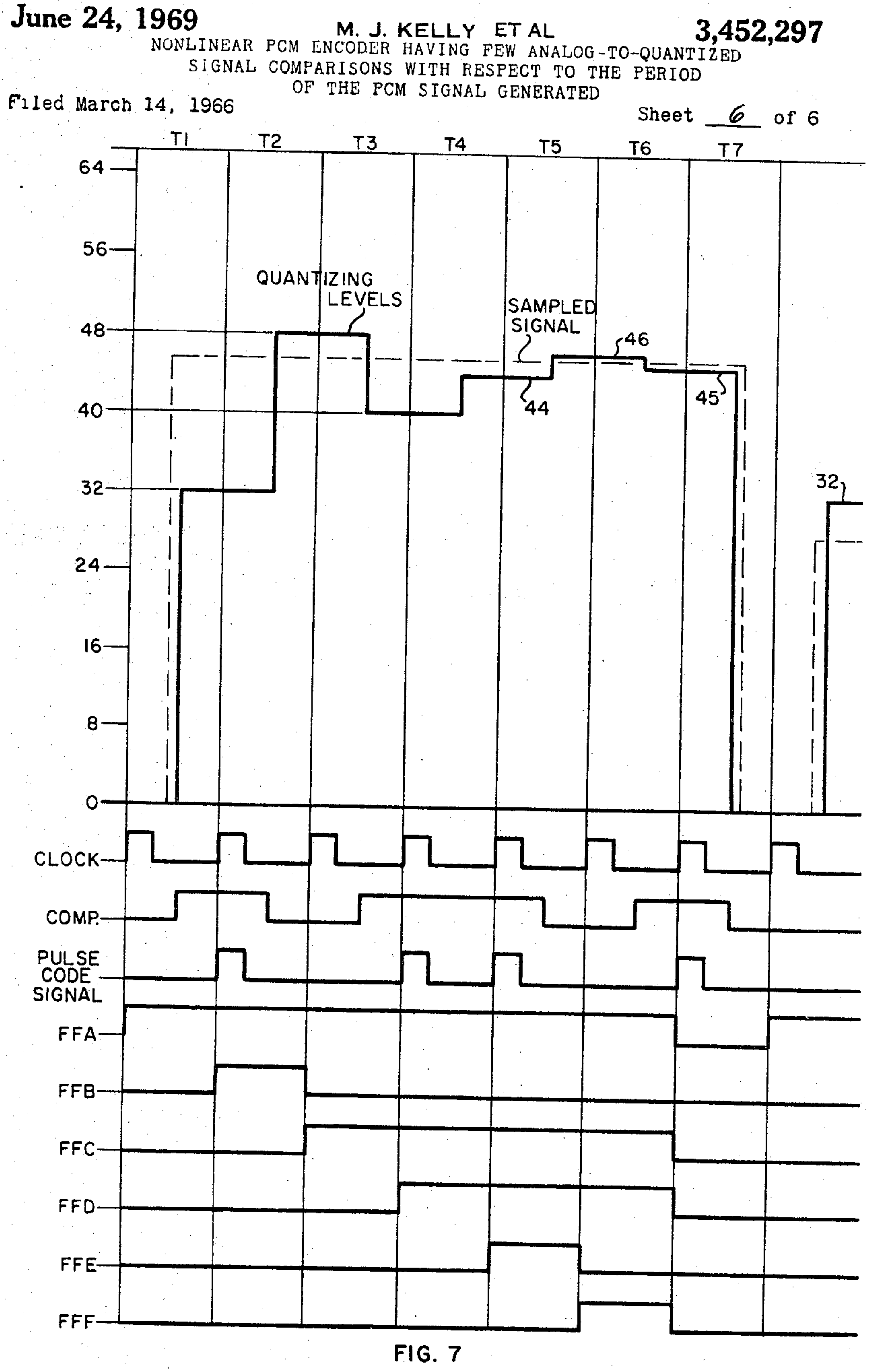
FIG. 7 is a timing diagram for the embodiment shown in FIGS. 2, 3, and 4.

A specific example of an encoding operation will be described with reference to the timing diagram of FIG. 7. In the graph at the top of FIG. 7 an amplitude of the sampled signal stored on the storage capacitor 11 is represented by a dotted line, and the quantizing levels generated by the generator 14 are represented by the solid lines. Below the graph, the clock pulses are shown for the encoding subintervals T1 to T7. The output signal COMP from the comparison circuit 12 is shown below the clock pulses and the output PCM signal from the coincidence gate 13 is shown below the output of the comparison circuit. Finally the states of the six flip-flops FFA to FFF are shown below the PCM signal.

The encoding operation begins with the arrival of the clock pulse in interval T1. It is assumed that the flip-flops are all in the 0 state, having been reset during the T7 subinterval of the preceding encoding interval. With the arrival of the clock pulse in interval T1, the storage capacitor 11 is charged to the amplitude of the sampled signal. If necessary, at this time the polarity of the sampled analog signal will be determined by apparatus which is not shown and a digit indicative of the polarity of the sampled signal will be produced. For purposes of illustration, we will assume that the polarity of the sampled signal is positive and that the digit 0 is produced to represent this at the beginning of subinterval T1.

Since all of the flip-flops FFA to FFF are in the 0 state, the inputs to coincidence gate 121 are all TRUE, and the output SA is correspondingly TRUE. Therefore, a TRUE signal exists on the S input of flip-flop FFA, and the clock pulse in subinterval T1 sets flip-flop FFA to the 1 state. At least one input to each of the gates 122 to 126 is FALSE so the outputs SB to SF of these gates are FALSE, and flip-flops FFB to FFF will not be set by the clock pulse. Moreover, since the outputs SB to SF of gates 122 to 126 are FALSE, the outputs 106 to 110 of gates 101 to 105 are also FALSE. Correspondingly, the outputs RA to RE of OR gates 111 to 115 are FALSE, since the inputs to these gates are all FALSE. Therefore, the clock pulse in interval T1 sets flip-flop FFA to 1 in accordance with the TRUE SA input, and the other flip-flops FFB to FFF remain in their 0 state since neither their S nor R inputs are true.

With flip-flop FFA set to 1 and all the other flip-flops in the 0 state, the three inputs, A, $\overline{B}$, and $\overline{C}$, to coincidence gate 205 are all TRUE, and the output $A\overline{B}\overline{C}$ is correspondingly true. Each of the other coincidence gates 201 to 208 and 301 to 307 has at least one FALSE input so all of their outputs are correspondingly FALSE. The TRUE output signal $A\overline{B}\overline{C}$ from gate 205 turns on switching transistors Q33 and Q1 so that impedance 235 is grounded and major current generator IA is turned on. The output current from IA through impedance 235 generates the major voltage corresponding to major quantizing level 32 at output terminal 220. This generated quantizing level is shown in the graph at the top of FIG. 7.

The generated quantizing level is compared with the amplitude of the sampled signal stored on storage capacitor 11 by the comparison circuit 12. Since the generated quantizing level has an amplitude less than that of the sampled signal, the comparison circuit registers a 1 output. The generated quantizing level remains as an input to the comparison circuit throughout the duration of the clock pulse in interval T2. Since the output COMP of the comparison circuit 12 is TRUE and this TRUE output coincides with the clock pulse in interval T2, a pulse is produced at the output of coincidence gate 13. This pulse corresponds to a digit 1, and this is the first digit of the pulse code signal.

Since flip-flop FFA is in the 1 state at the arrival of the clock pulse in subinterval T2 and the remaining flip-flops are all in the 0 state, all of the inputs to coincidence gate 122 are TRUE and the output SB is correspondingly TRUE. Each of the other coincidence gates 121 and 123 to 126 have at least one FALSE input, so their outputs SA and SC to SF are correspondingly FALSE. Therefore, flip-flop FFB is set to the 1 state by the clock pulse in subinterval T2. However, the output COMP of the comparison circuit 12 is TRUE so that the coincidence gate 101 is inhibited and has an output 106 which is FALSE. The input F to OR gate 111 is also FALSE since flip-flop FFF is in the 0 state, so that output RA is correspondingly FALSE. Therefore, flip-flop FFA has a FALSE signal on both its S and R inputs and will not be reset by the clock pulse in interval T2. Thus, during interval T2, both flip-flops FFA and FFB are in the 1 state and flip-flops FFC to FFF are in the 0 state.

With the flip-flops in these states, the output $A\overline{B}\overline{C}$ of coincidence gate 205 is no longer TRUE. Therefore, switching transistors Q33 and Q1 are no longer on, 235 is no longer grounded and major current generator IA is no longer on. However, the three inputs to the coincidence gate 207 are now all TRUE, and the output $AB\overline{C}$ is correspondingly TRUE. With $AB\overline{C}$ TRUE, switching transistors Q35 and Q3 are turned on, 237 is grounded and major current generator IC is turned on. The output current of major current generator IC through impedance 237 generates the major voltage corresponding to major quantizing level 48 at output terminal 220. As will always be the case with this particular embodiment, only one of the outputs of coincidence gates 201 to 208 is TRUE during any one particular subinterval because only one of the gates can have all of its inputs TRUE during any one particular subinterval. Moreover, as long as all of the flip-flops FFD to FFF are in the 0 state, none of the coincidence gates 301 to 307 will have a TRUE output, and correspondingly, none of the minor current generators I1 to I7 will be on.

The amplitude of the major voltage corresponding to the generated major quantizing level 48 is compared with the amplitude of the sampled signal by the comparison signal 12, and the output COMP of the comparison circuit 12 becomes FALSE since the amplitude of the major quantizing level 48 is greater than that of the sampled signal. Thus, with the arrival of the clock pulse in the subinterval T3, the output COMP is false, and a 0 will be provided at the output of coincidence gate 13 as the second digit of the pulse code signal.

At the time of the arrival of the clock pulse in the subinterval T3, all of the inputs to the coincidence gate 123 are TRUE, and the output SC is correspondingly TRUE. Therefore, the clock pulse will set the flip-flop FFC to 1. With the output SC of gate 123 TRUE, the output 107 of coincidence gate 102 is TRUE since the inhibit input COMP from the comparison circuit 12 is FALSE. With the signal on input 107 TRUE, the output RB of OR gate 112 is TRUE. This means that the signal on the R input of flip-flop FFB is TRUE at the arrival of the clock pulse in subinterval T3 so that flip-flop FFB is reset to 0 by this clock pulse. As a result, flip-flops FFA and FFC are in the 1 state and flip-flops FFB and FFD to FFF are in the 0 state.

With the flip-flops in these states, the three inputs to coincidence gate 207 are no longer all TRUE, and transistors Q35 and Q3 are no longer on. Thus major current generator IC is turned off and impedance 237 is no longer grounded. However, the three inputs to coincidence gate 206 are all TRUE, and the output $A\bar{B}C$ is correspondingly TRUE. With the output signal $A\bar{B}C$ TRUE, transistors Q34 and Q6 are turned on, impedance 236 is connected to ground, and major current generator IF is turned on. The output current of major current generator IF through impedance 236 generates a major voltage corresponding to major quantizing level 40 at output terminal 220. Since the amplitude of the major voltage corresponding to major quantizing level 40 is less than the amplitude of the sampled signal, the output COMP of the comparison circuit 12 becomes TRUE. The arrival of the clock pulse in the interval T4 coincides with the TRUE output COMP of the comparison circuit so that the output of the coincidence gate 13 becomes TRUE, and a "1" is generated as the third digit of the pulse code.

Since flip-flop FFC is in the 1 state at the arrival of the clock pulse in the subinterval T4 and the flip-flops FFD to FFF are in the 0 state at this time, all of the inputs to coincidence gate 124 are TRUE and the output SD is correspondingly TRUE. Thus with the arrival of the clock pulse in the subinterval T4, flip-flop FFD is set to the 1 state. The output COMP of the comparison circuit 12 is TRUE so that coincidence gate 103 is inhibited and its output 108 is FALSE. The output RC of OR gate 113 is also FALSE so that the signal on the R input FFC is FALSE and FFC will not be set to 0 by the clock pulse. As a result, the three inputs to coincidence gate 206 remain all true and the output $A\bar{B}C$ remains TRUE. Furthermore, impedance 236 and major current generator IF remain in operation in the circuit. It is evident that they will continue to remain in operation throughout the remainder of the encoding period since no further changes will be made in the states of the flip-flops FFA, FFB, and FFC until the end of the encoding period.

However, the three inputs to coincidence gate 304 have become all TRUE, and the output $D\bar{E}\bar{F}$ is correspondingly TRUE. A TRUE signal on the output $D\bar{E}\bar{F}$ turns on switching transistor Q11 which, in turn, turns on minor current generator I4. The output current of minor current generator I4 is added to the output current of major current generator IF, and both currents are conducted through impedance 236 to produce the minor voltage corresponding to minor quantizing level 44 at output terminal 220. Since the amplitude of the minor voltage corresponding to minor quantizing level 44 is less than that of the sampled signal, the output COMP of the comparison circuit 12 remains TRUE. Thus, upon the arrival of the clock pulse in the subinterval T5, the two inputs to coincidence gate 13 are TRUE, and another 1 is generated as the fourth digit of the pulse code signal.

The clock pulse in the subinterval T5 also sets flip-flop FFE to 1 in accordance with the TRUE output signal SE from coincidence gate 125. The TRUE output COMP of the comparison circuit 12 inhibits coincidence gate 104, and the output 109 is correspondingly FALSE. OR gate 14 thereby has two FALSE inputs, and the output RD is correspondingly FALSE. Thus, the clock pulse during the subinterval T5 does not reset flip-flop FFD, and that flip-flop remains in its 1 state.

With flip-flops FFD and FFE in the 1 state and flip-flop FFF in the 0 state, the three inputs to coincidence gate 304 are no longer all TRUE so the output $D\bar{E}\bar{F}$ becomes FALSE, and the switching transistor Q11 and the minor current generator I4 are turned off. However, at the same time, the three inputs to coincidence gate 306 become all TRUE, and the output $DE\bar{F}$ is correspondingly true. This output $DE\bar{F}$ turns on the switching transistor Q13 which turns on minor current generator I6. The output current of minor current generator I6 is added to the current of major current generator IF through impedance 236 to generate the minor voltage corresponding to minor quantizing level 46 at the output terminal 220. Since the amplitude of the voltage corresponding to minor quantizing level 46 is greater than the amplitude of the sampled signal, the output COMP of the comparison circuit 12 becomes FALSE. The arrival of the clock pulse in the subinterval T6 coincides with the FALSE output from the comparison circuit 12 so that the output of the coincidence gate 13 is FALSE and a 0 is produced as the fifth digit of the pulse code signal.

The clock pulse in the subinterval T6 also sets flip-flop FFF to the 1 state in accordance with the TRUE signal on the output SF of the coincidence gate 126. Coincidence gate 105 is not inhibited because the output COMP is FALSE. The output 110 of coincidence gate 105 is, therefore, TRUE; and the output RE of OR gate 115 is correspondingly TRUE. Thus, the clock pulse during the subinterval T6 resets flip-flop FFE to its 0 state. With flip-flops FFD and FFF in the 1 state and flip-flop FFE in the 0 state, the three inputs to coincidence gate 306 are no longer all TRUE, and the output $DE\bar{F}$ is correspondingly FALSE. As a result, switching transistor Q13 and minor current generator I6 are turned off. However, the three inputs to coincidence gate 305 have become TRUE, and the output $D\bar{E}F$ is correspondingly TRUE. This output $D\bar{E}F$ turns on the switching transistor Q12 which turns on the minor current generator I5. The output current of minor current generator 15 is combined with the output current from major current generator IF through impedance 236 to generate the minor voltage corresponding to the minor quantizing level 45 at output terminal 220. Since the amplitude of the voltage corresponding to the minor quantizing level 45 is less than that of the sampled signal, the output COMP of the comparison circuit 12 becomes TRUE. The arrival of the clock pulse in the subinterval T7 coincides with the TRUE output of the comparison circuit so that the output of the coincidence gate 13 becomes TRUE and a 1 is generated as the sixth digit of the pulse code signal.

Furthermore, since flip-flop FFF is in its 1 state, its output F is TRUE, and correspondingly OR gates 111 to 115 have one TRUE input and a TRUE output. With all of the signals on the leads RA through RF TRUE, the clock pulse during the subinterval T7 resets all of the flip-flops FFA to FFF to the 0 state so that the shift register is completely cleared and ready to begin the next encoding operation. During the subinterval T7, the storage capacitor 11 is discharged to 0 in preparation for its being recharged to the amplitude of the next sampled signal in the subinterval T1 of the next encoding operation.

The pulse code signal which has been generated at the output of the coincidence gate 13 as a result of the encoding operation described above has the six digits; 1, 0, 1, 1, 0, 1. This pulse code signal corresponds to the quantizing level 45, which is the minor quantizing level last generated in the encoding operation. It can be noted that the pulse code signal generated in serial form is equivalent to the states of the flip-flops in the shift register in parallel form; that is, flip-flops FFA to FFF having the states 101101, respectively, during the encoding interval T6. It can easily be seen from this that the decoding of this pulse code signal at the receiving end of the PCM system can be accomplished by using a generator identical to the one disclosed above by changing the serial pulse code signal to parallel form in a shift register having six flip-flops and then using the outputs of these flip-flops to drive an identical configuration of decoding gates to operate the various current generators and impedances in the generator.

From the detailed example of an encoding operation given above, the general operation of the generator 14 and logic network 15 is readily apparent. During each encoding period, the clock pulses set the flip-flops of the storage register to the 1 state in a one-at-a-time sequence. The state of the flip-flops during the interval of the decoding period determines the quantizing level to be generated by the generator. After this quantizing level has been compared with the amplitude of the sampled signal, the output of the comparison circuit is used to generate a digit of the pulse code signal and is also fed back to the logic network to tell it whether or not the quantizing level generated is less than or greater than the amplitude of the sampled signal. If the generated quantizing level is less than the sampled signal amplitude, the output of the comparison circuit inhibits the logic network from resetting the flip-flop which was set during the prior subinterval so that the next generated quantizing level will be greater than the immediately preceding quantizing level. If, however, the quantizing level generated is greater than the amplitude of the sampled signal, the output of the comparison circuit does not inhibit the logic network and the signal which causes the next flip-flop to be set also causes the immediately preceding flip-flop to be reset so that a lower logic level is generated next.

The connections between the outputs of the flip-flops of the shift register and the inputs of the decoding gates 201 to 208 and 301 to 307 are pre-arranged so that a particular quantizing level is always generated first, namely major quantizing level 32 as described above, and so that the second major quantizing level generated will be either a particular major quantizing level above the first generated level or a particular major quantizing level below the first generated level. Thus, in the encoder described above, the second major quantizing level generated is either the level 48 or the level 16. This operation proceeds through the subintervals of the encoding period with the output of the comparison circuit each time telling the logic network whether the quantizing level generated is greater than or less than the amplitude of the sampled signal and with the logic network correspondingly causing the generator to generate the next appropriate quantizing level for the next comparison.

It is to be emphasized that the specific embodiment described above is only intended as an illustration of the techniques involved in this invention. The techniques can be used for an encoder employing any number of digits. In addition, the generator is not limited to producing quantizing levels according to the type of quantizing characteristic disclosed, but is capable of generating quantizing levels in accordance with any expressible linear or nonlinear quantizing characteristic. Moreover, the quantizing characteristic selected can be divided into major and minor quantizing levels in any manner consistent with the number of digits employed in the pulse code signal. In the particular embodiment described above, the quantizing characteristic is divided into eight major quantizing levels and seven minor quantizing levels between each of the major quantizing levels. However, the number of major quantizing levels could have been chosen to be 2, 4, 16, or 32, instead of 8; in which case the number of minor quantizing levels would be correspondingly larger or smaller. With a different set of major and minor quantizing levels, the number of major current generators, impedences, and minor current generators would be changed accordingly so that the generator would generate the appropriate quantizing levels needed in the encoding operation. It turns out, however, that the selection of eight major quantizing levels and seven minor quantizing levels between each of the major ones is an optimum choice because the components required for the waveform generator are at a minimum for this choice.

It can be established that for the general case in which N digits are used in the encoding operation, the optimum choice for the number of major quantizing levels to be used is $2^n$, where $n$ is the largest integer less than or equal to $N/2$. For this optimum choice of major quantizing levels, the number of impedances required is $2^n$, the number of major current generators required is equal to $(2^n-1)$, and the number of minor current generators required is equal to $(2^{N-n}-1)$. Furthermore, the value of the impedances must be set in accordance with a relationship derived from the expression for the quantizing characteristic. For the general case, using the general type of characteristic curve given in the Equation 1 above, this relationship for an encoder employing N digits is the following:

$$\sigma_k=\sigma_{k-1}(1+\mu)^{2-n}$$

where $\mu$ is the compression factor $k=1, 2, \ldots 2^n$; and $\sigma_k$ is the conductance value of the $k$th impedance.

We claim:

1. In a pulse code modulation system in which an analog signal is sampled and the sampled signal is converted into an appropriate pulse code signal in accordance with a prescribed nonlinear quantizing characteristic, in combination:
   - a storage capacitor for storing a voltage equal to the amplitude of said sampled signal;
   - generating means for generating major and minor voltages corresponding to major and minor quantizing levels of said nonlinear quantizing characteristic;
   - comparison circuit means connected to said storage capacitor and said generating means operative to compare said generated voltages one-at-a-time with said stored voltage and to provide a first output signal when said generated voltage is less than said stored voltage and a second output signal when said generating voltage is greater than said stored voltage;
   - output circuit means connected to said comparison circuit means operative to produce a single output pulse each time one of said comparisons in said comparison circuit means produces said first output signal; and
   - logic network means connected to said comparison circuit means and said generating means operative to control the generation of successive ones of said major and minor voltages in accordance with the output signal from said comparison circuit means such that the successive outputs of said output circuit means are the digits of said appropriate pulse code signal.

2. A pulse code modulation system as claimed in claim 1, wherein said generating means includes:
   - first circuit means operative to generate a series of major voltages at a common output terminal, said major voltages corresponding to major quantizing levels of said quantizing characteristic and dividing said quantizing characteristic into major regions; and
   - second circuit means coupled to said first circuit means operative to generate in conjunction with said first circuit means a plurality of series of minor voltages at said output terminal, each of said series of minor voltages associated with one of said major regions of said quantizing characteristic, and said minor voltages in a particular one of said series corresponding to minor quantizing levels in said associated major region of said quantizing characteristic.

3. A pulse code modulation system as claimed in claim 2, wherein said first circuit means includes a plurality of individual voltage generating means connected to said common output terminal for generating individual ones of said major voltages thereat.

4. A pulse code modulation system as claimed in claim 3, wherein each of said individual voltage generating means includes an impedance and an associated major current generator, one end of said impedance and the output of said generator being connected to said output terminal, the output current of said generator being of such a magnitude with respect to the value of said impedance that the passing of said current through said impedance produces an individual one of said major voltages at said output terminal.

5. A pulse code modulation system as claimed in claim 4, wherein said impedances have values differing from one another in accordance with a relationship derived from said nonlinear quantizing characteristic, and said second circuit means comprises a plurality of minor current generators having outputs connected to said common output terminal, said minor current generators having output currents of such magnitudes with respect to the values of said impedances that the passing of said currents one-at-a-time through a particular one of said impedances produces one of said series of minor voltages at said output terminal by adding to the voltage at said terminal due to the output current from the major current generator associated with said particular impedance.

6. A pulse code modulation system as claimed in claim 5, wherein a switching transistor is connected to each of said major and minor current generators, the output of said switching transistor being connected to the input of said current generator, said switching transistor being turned on in response to a predetermined input signal and providing an output signal to turn on said current generator.

7. A pulse code modulation system as claimed in claim 4, wherein a switching transistor is connected to each of said impedances, the output of said switching transistor being connected to the other end of said impedance, said switching transistor being turned on in response to a predetermined input signal and providing a current path to ground reference potential for said impedance.

8. A pulse code modulation system as claimed in claim 5, wherein said nonlinear quantizing characteristic has $2^N$ quantizing levels, where N is any positive integer, and said quantizing levels are divided into $2^n$ major quantizing levels and $(2^N-2^n)$ minor quantizing levels, where $n$ is the largest positive integer less than or equal to $N/2$, so that the total number of said current generators and said impedances is a minimum.

9. A pulse code modulation system as claimed in claim 7, wherein said logic network means includes:

register means for storing a plurality of binary digits;

logic means connected to said register means to set the values of said digits in accordance with prearranged logical combinations of the values of said digits during a preceding interval and the output of said comparison circuit means; and decoding means connected to said register means to provide input signals to said switching transistors in accordance with predetermined logical combinations of said stored digits.

References Cited

UNITED STATES PATENTS

| | | | |
|---|---|---|---|
| 2,927,962 | 3/1960 | Cutler | 325—41 |
| 3,048,781 | 8/1962 | Glaser | 325—41 |
| 3,154,738 | 10/1964 | Greene et al. | |
| 3,371,277 | 2/1968 | Scantlin | 325—42 |
| 3,373,404 | 3/1968 | Webb | 325—41 X |
| 3,210,754 | 10/1965 | Roberts | 340—347 |
| 3,225,346 | 12/1965 | Buddenhagen | 340—347 |
| 3,223,992 | 12/1965 | Bentley et al. | 340—347 |

ALFRED L. BRODY, *Primary Examiner.*

U.S. Cl. X.R.

235—150.5; 307—262; 325—38, 41; 328—57, 61; 332—11; 340—347